United States Patent [19]

Durairaj et al.

[11] Patent Number: 4,892,908

[45] Date of Patent: Jan. 9, 1990

[54] RUBBER COMPOSITION AND METHOD FOR MAKING THE SAME

[75] Inventors: Bojayan Durairaj; Alex P. Peterson, Jr.; Gideon Salee, all of Pittsburgh, Pa.

[73] Assignee: Indspec Chemical Corporation, Pittsburgh, Pa.

[21] Appl. No.: 215,395

[22] Filed: Jul. 5, 1988

[51] Int. Cl.$^4$ .............................................. C08L 61/00
[52] U.S. Cl. .................................... 525/160; 525/132; 525/164
[58] Field of Search ....................... 525/164, 160, 132

[56] References Cited

U.S. PATENT DOCUMENTS 3,751,331 8/1973 Dane et al. .................... 524/493 X
4,605,696 8/1986 Benko et al. ........................ 524/432

Primary Examiner—Theodore E. Pertilla
Attorney, Agent, or Firm—Herbert J. Zeh, Jr.; Daniel J. Long; Arnold B. Silverman

[57] ABSTRACT

A vulcanizable rubber composition and method for making the same in which the rubber component is mixed with a methylene donor and acceptor and the methylene acceptor is a compound of the general structural formula

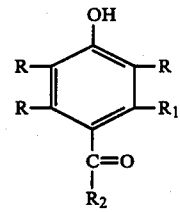

wherein R may be the same or different radicals and is consisting of hydrogen, alkyl of 1 to about 20 carbon atoms, aryl of about 6 to about 12 carbon atoms, $R_1$ is —H, —OH, —O—CO—$R_3$ or —O—$R_4$ and $R_3$ and $R_4$ are each an alkyl or aryl group having 1 to about 12 carbon atoms, and Wherein $R_2$ is a hydrogen radical, saturated or unsaturated of 1 to about 20 carbon atoms, naphtyl or an aromatic radical of the formula

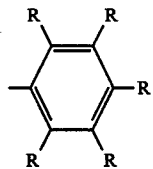

wherein R may be the same of different and is defined as above.

7 Claims, No Drawings

RUBBER COMPOSITION AND METHOD FOR MAKING THE SAME

BACKGROUND OF THE INVENTION

1. Field of the Invention

The present invention relates to resorcinolic derivatives for rubber reinforcement and, more particularly, relates to a low fuming novel resorcinolic compound that can be substituted for resorcinol without adversely affecting the cure and mechanical properties of the cured rubber compound.

2. Brief Description of the Prior Art

Resorcinol and resorcinol-formaldehyde resins have been used in the rubber industry as rubber compounds and adhesives. These resorcinolic compounds and resins are unique materials for rubber compounding since they act as thermosetting or vulcanizing plasticizers. They are very efficient plasticizers for rubber during the processing operations. This allows easier processing, higher loading and excellent extrusions of the rubber compounds.

The thermosetting properties of the resorcinol and resorcinol based resins on curing allow material increases in hardness, abrasion resistance, aging resistance, solvent and oil resistance, and stiffness, and give much improved finishes to the cured rubber stock. This combination of plasticizing and reinforcing action is rare for a single material. In addition these resorcinolic resins may act as antioxidants when used in the natural rubber.

Though resorcinol and resorcinol-based resins provide enhanced mechanical and adhesion properties, fuming associated with these materials is a problem to the tire industries. To solve this problem, tire manufacturers are looking for modified resorcinolic derivatives and resins that do not produce volatiles such as resorcinol at Banbury temperatures. In addition to low volatility, the new resorcinolic compound should have reactivity similar to resorcinol and be non-blooming in the rubber compound.

To overcome the problem of fuming, while maintaining equal reactivity like resorcinol, a monoester derivative of resorcinol, namely resorcinol monobenzoate, was used in the rubber compound. Improved dynamic mechanical properties were observed for the cured rubber. Resorcinol monobenzoate and derivatives of resorcinol similar to monobenzoate used in the rubber compositions is disclosed in U.S. Pat. No. 4,605,696. According to this patent the fuming characteristic of the resorcinolic compounds was assessed from the percent weight loss measured by thermogravimetric analysis (TGA). In addition to resorcinol monobenzoate, other resorcinol derivatives such as resorcinol monorosinate, resorcinol diphenyl ether, resorcinol monomethyl ether, resorcinol monoacetate, resorcinol dimethyl ether, phloroglucinol and its derivatives were also evaluated and disclosed in the above patent.

Besides ester and ether derivatives, keto derivatives of resorcinol, which are capable of reacting with methylene donors such as hexamethylenetetramine and hexamethoxymethylmelamine, can also be employed in the rubber compound to enhance the reinforcement and mechanical properties of the cured rubber stock. One such keto derivative of resorcinol is benzoylresorcinol. This benzoylresorcinol is now commercially available and is an excellent UV stabilizer for various polymers. None of the prior suggests or discloses the use of benzoylresorcinol as a rubber reinforcing compound and which may be employed in the place of resorcinol.

It is, therefore, a primary object of the present invention to provide keto derivatives of resorcinol, such as benzoylresorcinol, which are low fuming but have the cure and reinforcing characteristics like resorcinol in the rubber compound.

SUMMARY OF THE INVENTION

According to the present invention it has been discovered that the keto derivatives of resorcinol or phenol, which are not disclosed in the U.S. Pat. No. 4,605,696, can be used as reinforcing material in the rubber compounding.

Further, according to this invention, the keto derivative of resorcinol or phenol has the following general formula.

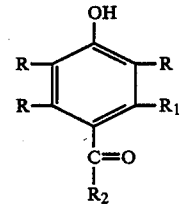

Wherein R may be the same or different radicals selected from the group consisting of hydrogen, halogen, alkyl of 1 to 20 carbon atoms, $R_1$ is —H, —OH, —O—CO—$R_3$ or —O—$R_4$ and $R_3$ and $R_4$ are each an alkyl or aryl group having 1 to 12 carbon atoms.

Wherein $R_2$ is a hydrocarbon radical, saturated or unsaturated, of 1 to 20 carbon atoms, naphthyl or an aromatic radical of the formula

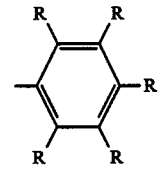

Wherein R may be the same or different and defined as above.

Further, according to the invention, benzoylresorcinol is a low fuming resorcinolic compound showing tensile and dynamic mechanical properties of the cured rubber compound similar to resorcinol. Benzoylresorcinol can therefore be substituted for resorcinol as a nonfuming resorcinol derivative in the rubber compound.

DESCRIPTION OF THE PREFERRED EMBODIMENT

Achievement of the objects in accordance with this invention, as embodied and broadly described, is related to an improved vulcanizable rubber composition comprising rubber, a filler material, methylene donor and benzoylresorcinol.

The following detailed description is exemplary and explanatory and it is to be understood that its scope is not limited to the embodiments and restrictive of the invention.

The surprising discovery of the present invention is that benzoylresorcinol is a nonfuming rubber compounding material that can be used as methylene acceptor in the resin forming reaction which occurs during vulcanization. This is particularly unexpected because benzoylresorcinol contains only two reactive sites per molecule when compared to three reactive sites for resorcinol to promote the resin forming reactions with methylene donors like hexamethylenetetramine (Hexa) and hexamethoxymethylmelamine (HMMM). Moreover, benzoylresorcinol is well known as a UV stabilizer and is used in various polymeric materials and rubber compounds and has never been realized as a rubber reinforcing compound. Benzoylresorcinol has the advantage of being more readily dispersed in the rubber, relatively non-toxic, and provides bond strengths equal to or better than can be achieved in a similar system using resorcinol. In addition, the presence of benzoylresorcinol, because of its characteristics, provides UV stability to the rubber compounds and articles.

Examples of other suitable keto derivatives of phenol, like benzoylresorcinol, that can be applied according to the invention have the following general formula.

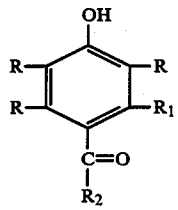

Wherein R may be the same or different radicals selected from the group consisting of hydrogen, halogen, alkyl of 1 to 20 carbon atoms, aryl of 6 to 12 carbon atoms, $R_1$ is —H, —OH, —O—COR—$R_3$ or —O—$R_4$ and $R_3$ and $R_4$ are each an alkyl or aryl group having 1 to 12 carbon atoms.

Wherein $R_2$, is a hydrocarbon radical, saturated or unsaturated, of 1 to 20 carbon atoms, naphthyl or an aromatic radical of the formula.

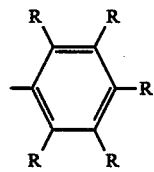

Wherein R may be the same or different and is defined as above.

According to this invention the benzoylresorcinol is preferably incorporated in the elastomeric compositions in an amount of from 1 to 50% by weight, preferably from 1 to 15% by weight, calculated on the elastomer. However, if required, larger quantities can be used.

The expression "rubber" used herein refers to natural and synthetic rubber. Representative synthetic rubbery polymers include the butadiene polymers. Butadiene polymers include those polymers having rubber-like properties which are prepared by polymerizing butadiene alone or with one or more other polymerizable ethylenically unsaturated compounds, such as styrene, methylstyrene, methyl isopropenyl ketone and acrylonitrile. The butadiene being present in the mixture preferably to the extent of at least 40% of the total polymerizable material. Other synthetic rubbers include the neoprene rubbers. Isobutylene rubber (butyl) and ethylene-propylene rubber (EPDM) may also be employed.

The rubber employed will contain various additives such as those needed to effect the vulcanization. Examples of these materials include sulfur, carbon black, antioxidants, zinc oxide, accelerators, silica, processing and softening oils and the like. These components are preferably employed in amounts varying from about 0.1 part to 100 parts per 100 parts of rubber.

Methylene donors in the vulcanizable rubber compositions, according to the present invention, are capable of generating formaldehyde by heating during the vulcanization includes various compounds disclosed in the specification of U.S. Pat. No. 3,751,331. Suitable examples of these methylene donors are hexamethylenetetramine, di- to hexa-methylol melamines or completely or partially etherified or esterified derivatives thereof, oxazolidine derivatives, N-methyl-1,3,5-dioxazine, or the like. The weight ratio of the methylene donor to benzoylresorcinol can range from 1:10 to 10:1.

A preferred method of making the rubber vulcanizate is to mix the rubber, carbon black, zinc oxide, lubricants and benzoylresorcino in a Banbury mixer at a temperature of about 150° C. The resulting masterbatch is then compounded on a standard 2-roll rubber mill with sulfur accelerators and formaldehyde precursor. The vulcanization composition is then shaped and then cured.

The following examples are given for the purpose of illustrating this invention and not intended as limitations thereof.

EXAMPLE 1

Fuming of resorcinol and its derivatives at Banbury temperatures are associated with the volatile products obtained from either the unreacted resorcinol and its compounds or their decomposition products. One way to determine the volatility of a material is to run the thermogravimetric analysis. Table I shows the thermogravimetric analysis results of resorcinol and benzoylresorcinol carried out in a nitrogen atmosphere.

TABLE I

| Thermogravimetic Analysis of Resorcinol Compounds | | | |
|---|---|---|---|
| | % Weight Loss at[1] | | |
| Compound | 125° C. | 150° C. | 175° C. |
| (1) Resorcinol (R) | 1.0 | 15.0 | 50.0 |
| (2) Benzoylresorcinol (BR) | 0 | 0 | 0.6 |

[1]Heating rate = 10° C./min in nitrogen atmosphere.

From this table it is very clear that benzoylresorcinol is a low fuming resorcinol derivative when compared to resorcinol.

EXAMPLE 2

The black natural rubber compounds were prepared in three stages. The basic compound formulation is shown in Table II.

TABLE II

| Rubber Compound Used in Reinforcing Tests | |
|---|---|
| Masterbatch | Parts by weight |
| Natural Rubber SMRL | 100.0 |
| HAF Black N-326 | 55.0 |
| Zinc Oxide | 8.0 |
| Stearic Acid | 1.2 |
| N—(1,3-Dimethylbutyl)-N'—Phenyl-p-Phenylenediamine | 2.0 |

TABLE II-continued

Rubber Compound Used in Reinforcing Tests

| Masterbatch | Parts by weight |
| --- | --- |
| Polymerized 1,2-Dihydro-2,2,4-Trimethylquinoline | 1.0 |
| N—(Cyclohexylthio)Phthalimide | 0.2 |
| Resorcinol; Benzoylresorcinol | 2.0 |
| Cobalt Naphthenate (12%) | 0.83 |
| Insoluble Sulfur (80%) | 4.69 |
| N—t-butyl-2-benzothiazolesulfenamide | 1.00 |
| Methylene Donor[1] | 2.00 |

[1]Hexamethoxymethylmelamine (65% HMMM) Hexamethylenetetramine (97% Hexa)

In the first stage, the black masterbatch was mixed in a Size 3 Banbury mixer to a dump temperature of 143° C. and sheeted to a thickness of 10 mm. In the second stage, an appropriate amount of the black masterbatch for each compound was mixed with the required level of resorcinol or benzoylresorcinol and cobalt compound on a two-roll lab mill at 118°–124° C. The compounds were sheeted and cooled. The sulfur, accelerator and appropriate amount of HMMM or hexa were added to the compound in the third stage, using the two-roll mill at 96°–102° C. The compounds were aged overnight in a constant temperature room at 23° C. and 50% relative humidity before testing.

Benzoylresorcinol was used as a 1:1 weight replacement for resorcinol.

Cure characteristics for each compound were determined with a Monsanto 100 Rheometer at 149° C., 1° arc and 1.67 Hz according to ASTM D2084-81 method.

The rheometer cure data wire adhesion data and dynamic mechanical analysis results carried out on the cured rubber samples are given in Table III.

TABLE III

Rubber Compound Properties

| Resorcinol Compound/Methylene Donor[1] | R/HMMM | BR/HMMM | R/Hexa | BR/Hexa |
| --- | --- | --- | --- | --- |
| Rheometer Cure at 150° C. | | | | |
| $M_H$, dN-m | 67.0 | 61.2 | 69.5 | 65.6 |
| $M_L$, dN-m | 9.0 | 8.8 | 8.6 | 8.1 |
| ts2, minutes | 2.8 | 3.3 | 2.8 | 2.3 |
| t'90, minutes | 13.3 | 13.0 | 17.0 | 13.5 |
| Adhesion (ASTM D-2229) lbs. | (% rubber coverage) | | | |
| Wire (63.5% copper) | | | | |
| Unaged | 288(90) | 208(70) | 343(95) | 176(50) |
| Steam 24 hours at 120° C. | 260(60) | 174(15) | 117(30) | 119(40) |
| Humidity 21 days, 85° C., 95% RH | 293(80) | 157(40) | 77(5) | 76(10) |
| Tensile[2] | | | | |
| 300% Modulus, MPa | 19.76 | 18.04 | 23.03 | 19.45 |
| Tensile Strength, MPa | 25.13 | 24.58 | 25.64 | 23.50 |
| Ultimate Elongation, % | 403 | 431 | 361 | 385 |
| Dynamic Mechanical[2,3] | | | | |
| Unaged | | | | |
| G' at 0.2% Strain, MPa | 14.48 | 15.94 | 15.90 | 15.43 |
| G" at 2.0% Strain, MPa | 1.86 | 2.09 | 2.04 | 1.96 |
| Heat Aged (3 Days, 100° C. Air) | | | | |
| G' at 0.2% Strain, MPa | 18.56 | 18.24 | 15.57 | 15.70 |
| G" at 2.0% Strain, MPa | 22.32 | 23.48 | 19.43 | 21.47 |

[1]Resorcinol compound/methylene donor ratio = 2.0 phr/2.0 phr
[2]Cured to t'90 at 150° C.
[3]Rheometrics Mechanical Spectrometer 800, 0.1 Hz, RT This data clearly demonstrates that the instant invention provides a replacement of lower volatile resorcinol derivative than resorcinol that does not adversely affect the curing properties of the rubber compounds.

What is claimed is:

1. A vulcanizable rubber composition comprising
   (a) rubber component selected from at least one member of the group consisting of natural rubber, styrene butadiene copolymer rubber, polyisoprene rubber, polybutadiene rubber, acrylonitrile butadiene rubber and polychloroprene rubber,
   (b) a methylene donor compound which is capable of generating formaldehyde by heating, and
   (c) a methylene acceptor selected from at least one compound of the general structural formula

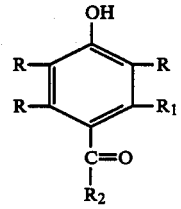

Wherein R may be the same or different radicals selected from the group consisting of hydrogen, alkyl of 1 to about 20 carbon atoms, aryl of about 6 to about 12 carbon atoms, $R_1$ is —H, —OH, —O—CO—$R_3$ or —O—$R_4$ and $R_3$ and $R_4$ are each an alkyl or aryl group having 1 to about 12 carbon atoms.

Wherein $R_2$ is a hydrocarbon radical, saturated or unsaturated of 1 to about 20 carbon atoms, naphthyl or an aromatic radical of the formula

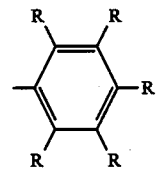

wherein R may be the same or different and is defined as above.

2. A vulcanizable rubber composition according to claim 1 wherein the methylene donor is hexamethoxymethylmelamine and hexamethylenetetramine.

3. A vulcanizable rubber composition according to claim 1 wherein the methylene acceptor is benzoylresorcinol.

4. A vulcanizable rubber composition comprising a rubber, a vulcanizing agent and the reaction product of (a) a methylene donor and (b) benzoylresorcinol.

5. In a method for making a rubber composition comprising the steps of mixing (a) a rubber component selected from at least one member of the group consisting of natural rubber, styrene butadiene copolymer rubber, polyisoprene rubber, polybutadiene rubber, acrylonitrile butadiene rubber and polychloroprene rubber, (b) a methylene donor compound which is capable of generating formaldehyde by heating, and (c) a methylene acceptor, wherein the improvement comprises using a methylene acceptor selected from the group consisting of compounds of the general structural formula

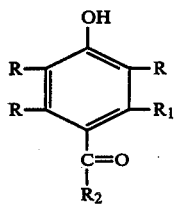

wherein R may be the same or different radicals selected from the group consisting of hydrogen, alkyl of 1 to about 20 carbon atoms, aryl of about 6 to about 12 carbon atoms, $R_1$ is —H, —OH, —O—CO—$R_3$ or —O—$R_4$ and $R_3$ and $R_4$ are each an alkyl or aryl group having 1 to about 6 carbon atoms.

Wherein $R_2$ is a hydrocarbon radical, saturated or unsaturated of 1 to about 20 carbon atoms, naphthyl or an aromatic radical of the formula

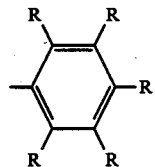

wherein R may be the same or different and is defined as above.

6. The method of claim 5 wherein the methylene donor is hexamethoxymethylmelamine and hexamethylenetetramine.

7. The method of claim 5 wherein the methylene acceptor is benzoylresorcinol.

* * * * *

UNITED STATES PATENT AND TRADEMARK OFFICE
CERTIFICATE OF CORRECTION

PATENT NO. : 4,892,908

DATED : January 9, 1990

INVENTOR(S) : BOJAYAN DURAIRAJ ET AL

It is certified that error appears in the above-identified patent and that said Letters Patent is hereby corrected as shown below:

On the title page, Abstract, in the seventh line of text,
"hydrogen" should be --hydrocarbon--.

On the title page, Abstract, second from last line,
"same of" should be --same or--.

Col. 3, line 38, "COR" should be --CO--.

Col. 4, line 25, "benzoylresorcino" should be --benzoylresorcinol--.

Signed and Sealed this

Seventeenth Day of March, 1992

Attest:

HARRY F. MANBECK, JR.

*Attesting Officer*      *Commissioner of Patents and Trademarks*